Patented Mar. 25, 1952

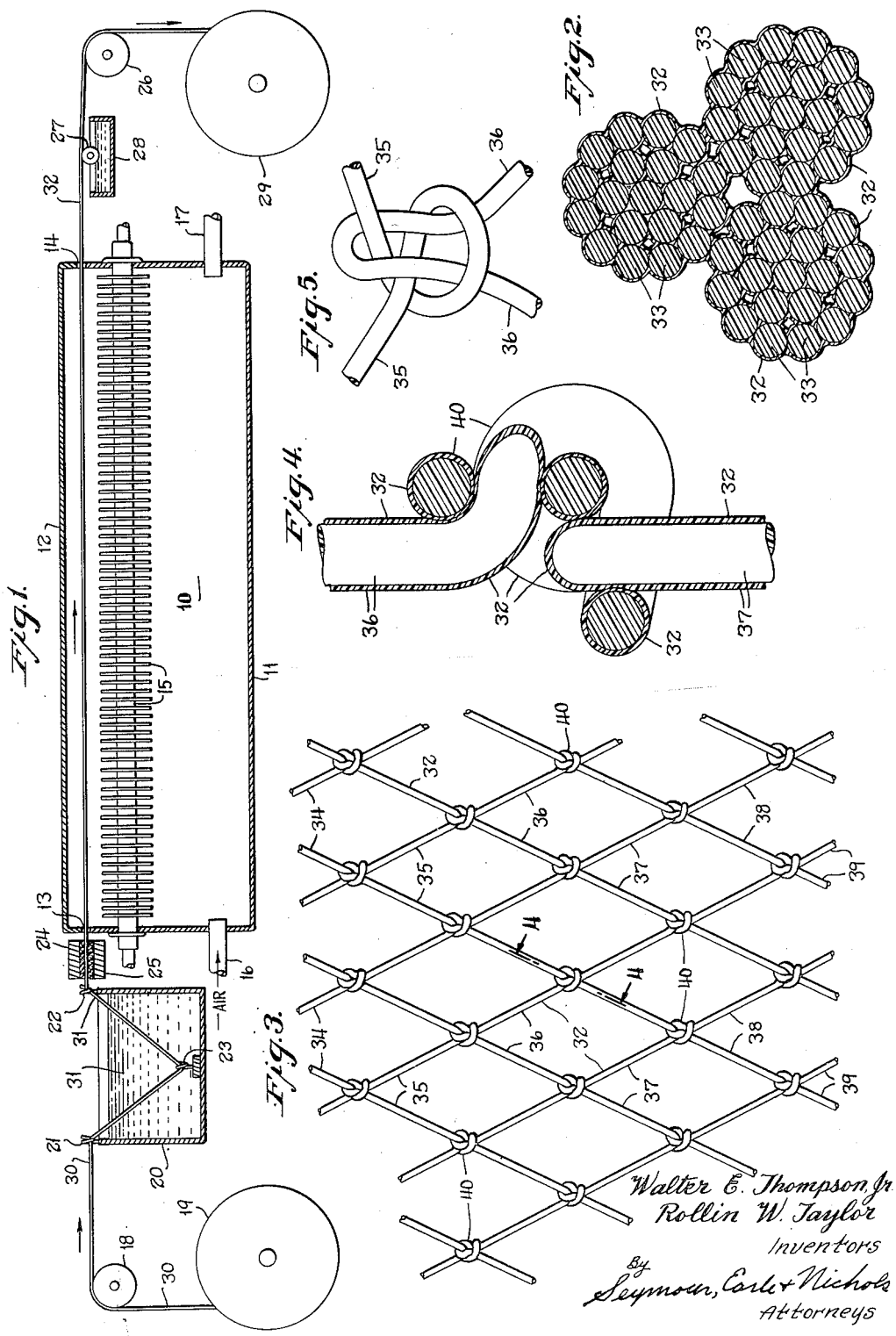

2,590,586

UNITED STATES PATENT OFFICE 2,590,586

FISH NET FORMED OF SYNTHETIC RESIN STRANDS AND STRANDS THEREFOR AND METHOD OF PRODUCING SAME

Walter E. Thompson, Jr., Watertown, and Rollin W. Taylor, Terryville, Conn., assignors to The Heminway & Bartlett Mfg. Co.

Application November 21, 1951, Serial No. 257,452

31 Claims. (Cl. 87—12)

1

The present invention relates to improvements in nets and relates more particularly to nets for catching fish and to strands for the manufacture and repair of such fishnets.

For a long time it has been the custom to produce fishnets from strands of cotton, linen or other vegetable fibers which are relatively short-lived under the action of sun, water, wear and strains.

The advantages of synthetic resin strands, of which nylon may be considered representative, as compared to cotton, linen and other vegetable fibers have long been appreciated, and efforts have heretofore been made to employ such synthetic resin strands in fishnets to thus take advantage of the better fishing quality, superior strength, mildew resistance, etc., afforded by the use of such strands.

Such prior efforts to employ strands of synthetic resins in the construction of fishnets have not, however, met with appreciable success, since despite the knotting-together of the strands at their respective crossings, the knots would open up upon even slight flexing of the fishnet, with the result that the predetermined sizes of the openings in the nets would be lost and such fishnets would become substantially useless. This is particularly so in gill nets.

The main object of the present invention is to provide synthetic resin strands from which superior fishnets may be formed, and in which the component strands of the fishnet will remain interlocked at their crossings, to thus retain the predetermined sizes of the openings despite repeated flexings of the fishnet. This is accomplished in part by substantially suppressing the plastic memory of the synthetic resin strands and in part by providing the synthetic resin strands with a coating of a different synthetic resin which will tenaciously adhere thereto, which has greater compressibility than the synthetic resin from which the strand core is formed, and which preferably has greater surface friction characteristics, that is, a higher friction coefficient, than the strand core. When a knot is tied in such a coated strand, the coating, where the strands bind upon themselves in the knots, is compressed so that portions of the strands are partially forced into one another and interengage over a much larger area. The partial forcing of the strands into one another, the greater surface friction characteristics of the coating, and the greater area of contact, all contribute to such greater friction in the knots that the knots do not open up, and the predetermined size of the openings of the net are maintained.

2

Further objects of the present invention are to provide superior fishnets made from the coated strands, and a new method whereby the coated strands of synthetic material may be produced.

Other objects and advantages will appear to those skilled in the art from the following more detailed disclosure.

The invention will be further described in connection with the accompanying drawings, which disclose, for illustrative purposes, modes of carrying out the present invention.

In the drawings:

Fig. 1 is a schematic view mainly in section of an apparatus suitable for preparing strands of synthetic resin for use in fishnets, in accordance with the present invention;

Fig. 2 is a transverse sectional view on an enlarged scale of a strand after the same has been treated in apparatus illustrated in Fig. 1;

Fig. 3 is an elevational view of a fragment of the fishnet embodying the present invention;

Fig. 4 is a broken detail sectional view taken on the line 4—4 of Fig. 3; and

Fig. 5 is a fragmental section of a junction point of the fishnet shown in Fig. 3 with the knot shown loose to illustrate the preferred interconnection of strands.

The novel strands from which the improved fishnets of the present invention are formed comprise a continuous core of a filament-forming synthetic resin formed from a polar compound or compounds, and a relatively thin coating of a synthetic resin made from a water-insoluble polar compound or compounds, or a non-polar compound which is plasticized with a plasticizer which exhibits good polarity and will impart increased adhesiveness to the non-polar resinous material, which coating does not react with or dissolve the core; is more compressible than the core; has surface friction characteristics greater than the core; and which will form a strong bond with the core so that it is not stripped from the core during the formation of the knots or when a strain is placed on the knots after they have been formed. The rubbers, both natural and synthetic, including latex, are not satisfactory as coating materials, since they do not form a sufficiently-adhering bond with the core materials to prevent them from being stripped off during the tying of the knots. The coating also should be one which does not become brittle at relatively low temperatures of the order of 30° F., nor become tacky at temperatures up to about 120° F. "Tackiness," or the equivalent, as used herein, is that degree of adhesiveness which will cause the coated strands to adhere to themselves or one another. The coating, and preferably both the coating and the core, should be resistant to fungus and fire, and should not swell appreciably in water. The coating also preferably should have an elongation modulus at least equal to that of the core.

The core of the strand may be made from any of the filament-forming synthetic resins, both thermoplastic and thermosetting. These include (1) the linear polyamides, that is, compounds of the general formula:

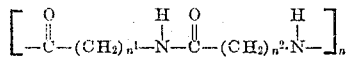

in which $n$ is an integer of indeterminate number, dependent upon the degree of polymerization, $n^1$ and $n^2$ are integers of about six or more, of which polyhexamethylene adipamide (nylon) is a typical example, (2) the acrylic resins, that is, compounds having the general formula:

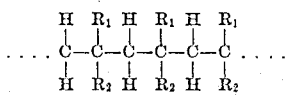

wherein $R_1$ may be H and $R_2$ may be $COOR_3$ to yield polyacrylic ester, or $R_1$ may be $CH_3$ and $R_2$ may be $COOR_3$ in which $R_3$ is $CH_3$ or $C_2H_5$ to yield a polymethyl or polyethyl acrylic ester, or $R_1$ may be H and $R_2$ may be CN to yield polyacrylonitrile (Orlon), (3) the ester-type resins, that is, polyesters derived from polyhydric alcohols and polybasic acids, such as the resins produced from the esters of ethylene glycol and terephthalic acid (Dacron), (4) the vinyl resins, that is, compounds having the general formula:

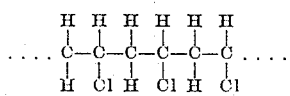

(5) copolymers of the resins of the respective classes set forth above, such as the resin formed by the copolymerization of vinyl chloride and vinylidene chloride, and (6) copolymers of the resins of the different classes, such as the resin formed by the copolymerization of vinyl chloride and acrylonitrile (Vinyon).

The core strand may be coated with any film-forming resin, either thermoplastic or thermosetting, which of itself or when plasticized, is (1) water-insoluble, (2) more compressible than the core, (3) exhibits good polarity, so that it will form a good bond with the core strand, and (4) which preferably has a higher friction coefficient than the core strand. Thus, the coating may be formed from: (a) the ester-type resins, such as the polyester resin derived from ethylene glycol and terephthalic acid, and maleic and alkyd resins, (b) the vinyl resins and their substituted products, such as polyvinyl chloride, and polyvinyl butyral, (c) the linear polyamides, such as nylon, (d) polystyrene resins, (e) the acrylic resins, for example, the polyacrylates, and substituted acrylic resins, such as the polymethacrylates, (f) the coumarone resins, (g) melamine-formaldehyde resins, (h) the furan resins, and (i) copolymers of any of the above resins of the same type or of different types, for example, the resin formed by the polymerization of acrylonitrile and vinylidene chloride.

For most fishing purposes it is desirable that the fishnet be as transparent as possible, as such nets are considered to "fish" better, that is, yield a larger catch of fish. For that reason, the furan and coumarone resins, which are darker in color, ordinarily would not be used for most types of fishnets. Yet they possess the necessary characteristics, when used as coatings for the core strand, to impart knot-retentivity to the coated strand.

The filament-forming cellulose products, such as viscose, cellulose acetate, cellulose acetate-butyrate, cellulose nitrate, and cupra-ammonium cellulose, are not included in the above list of filament-forming resins, since such products while having many of the attributes of resins are not, strictly speaking, resins. Moreover, such materials do not possess adequate strength where a fishnet possessing the maximum desirable characteristics is desired. Nevertheless, the use of a coating having the characteristics set forth above on cores made from such cellulosic products definitely improves them for use in fishnets and renders the resulting strand knot retentive so that the knots do not loosen and open up with resultant loss of the predetermined sizes of the openings in the net.

The resin used for the coating may be of the same type as the resin of the core strand, or it may be of a different type, as long as it is water-insoluble, more compressible than the core strand and forms a good bond with the core strand so that it is not stripped off during the fabrication of the nets, or in the knots thereafter. If the resin is of the same type, it should be formed of different specific materials, polymerized to a different extent, or properly plasticized to give it the necessary characteristics for the coating.

The synthetic resins referred to for use as the core material are, in normal condition, when shrunk, characterized by relatively high elongation, a "plastic memory" and other deficiencies which, in the absence of the coating of the present invention, would render such resins unsuitable for use in fishnets, aside from the fact that they do not possess knot-retentivity characteristics. Consequently, they must be treated so that when they are shrunk (a prerequisite for the use of resin strands in the formation of fishnets and other fabrics) they will have their plastic memory suppressed, and will have an elongation within certain predetermined limits. The minimum elongation should not be less than about 14% and preferably not less than about 16%, regardless of the denier of the strands; but the maximum desired elongation is dependent upon the denier of the particular strands. If the elongation of the shrunken strand is too low, its tensile or breaking strength is lowered, its knot strength is less, that is, it will break at the knots and the mesh will then be destroyed, and its resistance to abrasion is lowered. If the elongation is too great, it is difficult to fabricate, the knots will back off, that is, open up, and the openings of the fishnet do not remain of the desired predetermined size. The percentage elongation is independent of the resinous material from which the strands are formed.

Nylon, for example, is sold in strands consisting of groups of filaments. These strands are spun and then twisted with one or more like spun strands to give the desired multi-filament, twisted strand, and then shrunk. The original strand has an elongation of about 18%. After spinning and twisting, the resulting strand will have an elongation of about 20%. But after being shrung, it will have an elongation of about 30%, which is normally too high for strands to be used in the formation of fishnets, particularly when the fishnet is made of twines of the lower true deniers.

In accordance with the invention, the shrunken strands are treated to substantially suppress their plastic memory and to reduce their elongation to between a minimum of about 14% and a maximum determined by the formula:

$$E_m = 20 + (D_t - 420) \times 0.002$$

in which $E_m$ is the maximum elongation of the strand and $D_t$ is the true denier of the strand.

To apply the coating to synthetic resin cores of the character above referred to, and thereby render them suitable for use in the fabrication and mending of fishnets, various apparatus may be employed. A preferred form is illustrated in Fig. 1 of the accompanying drawings.

In Fig. 1 there is schematically illustrated a heating and drying chamber generally designated by the reference character 10 and comprising a body 11 and having a removable cover 12. The cover is provided at its opposite ends with notch-like inlet- and outlet-apertures 13 and 14, respectively, through which the strand may move in a lengthwise direction in a manner as will hereinafter appear.

In a plane beneath the apertures 13 and 14 above referred to, the body 11 of the chamber 10 is provided with a heater generally designated by the reference character 15 and which, in the present instance, is in the form of a finned tube through which the steam or other suitable heating media may be passed in a manner well known in the art. Preferably, and as shown, the body 11 is also provided with air-inlet and air-outlet tubes 16 and 17, respectively, located adjacent its opposite ends, through which air may be passed.

Located at the inlet side of the heating and drying chamber 10 is an idler-roll 18 beneath which is located a supply-reel 19 upon which is wound the supply of the twisted and unshrunken multi-filament synthetic resin core to be treated.

Between the idler-roll 18 and the adjacent end of the chamber 10 is a tank 20 open at its upper end and adapted to contain a supply of coating material to be applied to the strand core. As shown, the upper edges of the opposite side walls of the tank are provided with guide-eyes 21 and 22, respectively, while mounted substantially centrally on the upper surface of the bottom of the tank is a guide-eye 23 located beneath the level of the coating material in the tank.

Between the tank 20 and the adjacent end of the heating and drying housing is a pair of compression plates 24 and 25, respectively, located above and below the path of travel of the strand or strands on their way to the heating and drying chamber, these compression plates preferably having inner faces of felt or other suitable material which are pressed against the coated strand after it leaves the tank 20 to act as wipers or a hold-back device for purposes hereinafter to appear. The compression plates 24 and 25 may be adjustably forced toward each other to frictionally grip the strand or strands extending therebetween in any suitable manner.

Located adjacent and beyond the outlet end of the chamber 10 is an idler-roll 26 over which the strand or strands pass after first having passed over a coating-roll 27. The coating-roll is mounted with freedom for rotation so that its lower portion extends into a tank 28 to pick up and to apply to the strand a liquid antistatic material contained therein.

Located below the idler-roll 26 is a take-up reel 29 which may be driven by any suitable power means as is well understood in the textile art.

The apparatus above described is adapted to apply the desired coating to cores of synthetic material to provide the strands of the present invention. It may here be explained that the term "core" is used herein to connote strand-like material which, in the trade, is sometimes also referred to as "cord," "twine" and similar terms, since the diameter or denier of the so-called core may vary widely, depending upon the character of the net which it is intended to produce. The cores referred to are usually composite strands, i. e., are made up of a plurality of individual filaments twisted together in a manner well known in the art.

As will appear more fully from the following, the present invention not only contemplates the coating of cores of synthetic material with a coating having the characteristics previously indicated, but also the stretching and drying of the cores after coating, and in the presence of heat from about 150° F. to any higher temperature which will be below the softening point of the particular core material being subjected to the heat.

A raw core 30 of synthetic resin material is drawn from the supply-reel 19 and is thence passed over the idler-roll 18 and through the eye 21 on the tank 20. The core 30, as before noted, may be formed of any suitable filament-forming synthetic resin or combination of such resins.

The raw core, after passing through the guide-eye 21, passes downwardly through a body of the resinous coating material 31, in liquid form, in the tank 20 and through the guide-eye 23 in the latter. Upon leaving the guide-eye 23, the raw core, with the resinous coating 31 thereon, passes upwardly through the guide-eye 22 on the upper edge of the tank 20, thence between the compression-plates 24 and 25 where excess coating material is wiped off, and where frictional restraint is placed upon the now coated and wet core.

After passing from between the compression-plates 24 and 25, the core, with its still-wet coating, passes through the inlet-aperture 13 into the chamber 10, and, after being subjected to the heat in the chamber 10, passes outwardly through the outlet-aperture 14, in a substantially dry condition and with a substantially dry resilient coating 32 thereon, provided by the drying of the liquid coating material 31.

After emerging as described, from the outlet-aperture 14, the coated core passes over the coating-roll 27 which applies to the coated core a coating of any known anti-static material.

After leaving the coating-roll 27, the coated core passes over the idler-roll 26, thence downwardly onto the take-up reel 29.

The coating bath is an oil-in-water emulsion or dispersion of the resinous material which is to form the coating on the core. The concentration of the resinous material in the emulsion or dispersion will depend upon the viscosity of the particular resinous material, but normally will be between 10 and 20%, about 18% being preferred for most resinous materials. However, with the more viscous resins, like polyvinyl butyral, fairly dilute concentrations of the order of 10% will be adequate. The essential thing is that the core in passing through the bath must pick up enough of the emulsion or dispersion so that when the water subsequently is driven therefrom and the residual resin has set, a coating of the desired thickness will be left on the core. We have found that a coating on the core containing from 10 to 20% of resin on the basis of the weight of the core will provide a coating of the desired thickness. Neither the temperature of the coating bath, nor the length of time the core remains in the bath is important as long as the core picks up enough of the coating to leave a coating of residual resin of the desired thickness on the core. A larger core will require more time in the bath to permit sufficient pick-up for adequate penetration during the subsequent heating operation.

If it is desired to incorporate a plasticizer in the resin used for coating the core, it may be incorporated in the resin before it is emulsified or dispersed in the aqueous medium of the bath, or added directly to the bath, whichever in any particular case seems most desirable.

The presence of water in the coating bath 31 is essential, since when the coated core is subsequently heated, the heat and water combine to suppress the plastic memory of the synthetic resin of the core to a marked degree, thus assisting in preventing opening up of the knots when the coated core subsequently is used in fishnets.

The restraint imposed upon the coated core by the compression-plates 24 and 25 or equivalent, causes the portion thereof intermediate the compression-plates and the take-up reel 29 to be stretched by the pull of the take-up reel 29. The tension under which the coated core is maintained while passing through the chamber 10, regardless of the particular resin used in the core, is from about 30% to about 65% of its dry breaking strength, though the preferred tension is approximately 40 to 50% of the dry breaking strength of the strand.

The heater 15 or its equivalent is so operated as to heat the coated core while it is passing through the chamber 10, so that when the coated core passes outwardly through the outlet-aperture 14 of the chamber 10, the coating thereon will be dry and its temperature, as well as that of the core, will be above 150° F. and preferably above the boiling point of the aqueous medium in which the resinous coating material was emulsified or dispersed, but below that temperature at which softening of the core material would start. The coated core preferably is heated to a temperature of between 215° F. and 270° F., and for most core materials heating to about 230° F. will be found most satisfactory.

The raw core 30, after leaving the supply-reel 19, is, as described above, first coated and subsequently stretched, heated and dried, with the result that the denier of the core is raised, its plastic memory is substantially suppressed, its elongation is reduced to within the limits previously stated, and the coating is firmly attached to the filaments of the core, which latter, in their stretched condition, are designated by the reference character 33 in Fig. 2. For example, a 210 denier core of 13 turns S spin of matched 2 cord, 11 turns Z twist when subjected to a tension of 40% of its dry breaking strength while passing through the heating and drying chamber 10 will have its denier raised to 420; and a core of three ends of 210 denier of 9 turns S spin of matched 3 cord 7 turns Z twist will have a final denier of 1890. In each case the elongation will be reduced to within the above limits, the plastic memory will be substantially suppressed and the coating will be firmly attached to the core.

By applying the wet or liquid coating material 31 to the synthetic resin core before the latter is stretched, the aqueous dispersing-agent in the coating 31 will cause some swelling of the synthetic resin of the core. This will have the effect of causing the said coating material when dried into the form 32, to firmly adhere to the strand and its component filaments. It also is desirable in obtaining the necessary suppression of the plastic memory of the core. Further, the procedure just outlined will insure that the coating material penetrates into the interstices between the various filaments such as 33, which penetration is difficult to achieve if the coating is applied while the strand is under high tension. Complete penetration of the interstices of the core in the bath is not necessary. If substantialy penetration of the exterior portions of the core is obtained, moisture will be driven into the interior portions of the core, as it traverses the heating chamber 10, in amount sufficient, with the existing heat, to bring about the desired suppression of the plastic memory of the core. In Fig. 2, an illustrative finished strand is shown which is composed of a multiplicity of the stretched filaments 33 twisted together into three (more or less) groups and with the dry and resilient coating material 32 penetrated into the interstices between the filaments 33 and thoroughly coating the said filaments.

When subsequently wetted in water at normal temperatures, the finished and coated strand of the present invention will not retract, since for all temperatures less than about 20° F. to 25° F. below the temperature at which the strand was dried, the "plastic memory" has been suppressed.

The liquid coating material 31 may have a wide variety of compositions and may include any of the synthetic resins previously mentioned as suitable for the coating, as long as it meets the basic requirements set forth above.

Among the numerous resilient coating materials suitable for use in carrying out the present invention, the following will serve for purposes of preferred specific examples. In each case the strand was coated in the manner described above.

*Example I*

An aqueous emulsion containing 15 parts by weight of a polyester resin derived from ethylene glycol and terephthalic acid and 3 parts of methyl phthalyl ethyl glycolate yielding a total solid content of 18% was applied to an unshrunken twine manufactured from 200 denier Orlon (polyacrylonitrile) double 4, 7 turns S spin, matched 3 cord, 5 turns Z twist.

*Example II*

A solution of a linear polyamide resin of the type known as 8—8 (that is wherein $n^1$ and $n^2$ in the general formula are equal to 8) containing 1 part of resin, 2 parts of water, and 7 parts of ethyl alcohol, yielding a final concentration of 10%, was applied to an unshrunken twine produced from 210 denier Dacron (polyethylene glycol terephthalate) double 3, 90 turns S spin, matched 3 cord, 7 turns Z twist.

*Example III*

An emulsion containing 18 parts by weight of polyvinyl chloride and 2 parts by weight of polybutyl benzyl phthalate having a total solids content of 20% by weight was applied to an unshrunken 210 denier twine made from nylon, double 3, 6 turns S spin, matched 8 cord 1½ turns Z twist.

Example IV

An aqueous dispersion containing 28 parts of polystyrene resin and 10 parts of diethyl phthalate having a total solids content of 38% was applied to an unshrunken nylon twine manufactured from 100 denier nylon, 17 turns S spin, matched 3 cord, 13 turns Z twist.

Example V

An emulsion containing sixteen parts by weight of a polyacrylonitrile ester and three parts by weight of a butyl phthalyl butyl glycolate plasticizer was applied to an unshrunken twine made from 210 denier nylon, 17 turns S spin, matched 2 cord, 13 turns Z twist.

Example VI

An emulsion containing 12 parts by weight of a copolymerized acrylonitrile-vinylidene chloride (consisting of 85% of acrylonitrile and 15% of vinylidene chloride) and 2 parts of an alkyl aryl phosphate plasticizer to give a total solids content of 12 parts by weight, was applied to an unshrunken twine made from 200 denier Orlon (polyacrylonitrile) 13 turns S spin, matched 3 cord, 11 turns Z twist.

Example VII

An aqueous emulsion containing 22 parts by weight of plasticized polyvinyl butyral and 1 part by weight of a polymerized silica was applied to an unshrunken twine made from 70 denier nylon, double 2, 17 turns S spin, matched 3 cord, 13 turns Z twist.

Example VIII

An emulsion of melamine-formaldehyde resin containing 12 parts by weight of the resin and 3 parts by weight of a plasticizer which is a mixture of ortho and para toluene sulfonamide was applied to an unshrunken nylon twine manufactured from 840 denier nylon, 9 turns S spin, matched 3 cord, 7 turns Z twist.

Example IX

An emulsion containing 14 parts by weight of a resin derived from a maleic acid and a polyhydric alcohol and 2 parts by weight of dibutyl phthalate yielding a formulation with a total solids content of 16% was applied to an unshrunken twine made from 70 denier Dacron (ethylene glycol terephthalate) double 2, 14 turns S spin, matched 3 cord, 10 turns Z twist.

Example X

A water emulsion containing 70 parts of polystyrene (40% solids), 5 parts of dibutyl phthalate and 20 parts of water was applied to an unshrunken twine formed of 200 denier Vinyon N (a copolymer of vinyl chloride and acrylonitrile) double 3, 12 turns S spin, matched 3 cord, 9 turns Z twist.

Example XI 70 parts of a water emulsion of polystyrene (40% solids), 10 parts diethyl phthalate, and 20 parts of water were applied to an unshrunken twine formed of 70 denier nylon, double 2, 17 turns S spin, matched 3 cord, 3 turns Z twist.

Example XII

A composition containing 1 part of 8-8 linear polyamide, 2 parts water, and 8 parts ethyl alcohol (95%) were applied to an unshrunken twine formed of 210 denier nylon, double 5, 7 turns S spin, matched 3 cord, 5 turns Z twist.

Example XIII

A water emulsion of 55 parts of polyvinyl butyral (40% solids), 40 parts water, and 5 parts of polymerized silica in a 20% dispersion was applied to an unshrunken twine formed of 210 denier nylon, double 2, 12 turns S spin, matched 3 cord, 9 turns Z twist.

Example XIV

A composition containing 1 part of 8-8 linear polyamide, 2 parts water, 8 parts ethyl alcohol (95%), and 0.3 part dibutyl phthalate was applied to an unshrunken twine formed of 100 denier Orlon (polyacrylonitrile), double 3, 12 turns S spin, matched 3 cord, 9 turns Z twist.

In all of the above examples, the specified denier is that of the yarns. The true denier of the twine would be much higher. Thus, the true denier of the twine of Example I would be the product of the denier of the yarns, the double, and the matched cord, that is, 2400.

In all of the above examples, the resultant coated strand had satisfactory knot-retentive characteristics and was satisfactory in all respects for the manufacture of fishnets. Also, it had an elongation within the above limits.

The stretched, pre-set, hardened and coated strands (Fig. 2) produced in the manner above described, may be formed into fishnets in any of the usual manners such, for instance, as the manner indicated in Figs. 3 and 4 wherein a series of such strands respectively designated by the reference characters 34, 35, 36, 37, 38 and 39, are directed back and forth in diagonal paths and interknotted as at 40 with adjacent strands. The knots employed may vary but usually are of the so-called "bowline" type. By having the interknotted strands treated as above described, the knots, once formed, will not open up, once having been pulled into place, with the result that the predetermined mesh of a net such as is shown in Fig. 3, will be preserved, despite long periods of use and repeated immersion in water and repeated dryings.

Fig. 5 is directed at showing the character of the particular knots shown, but prior to being tightened, and also at showing the result of employing strands of synthetic resins not having the characteristics of the present invention. Should the knots of Fig. 3 open up into the form illustrated in Fig. 5, the strands would slide with respect to each other and the mesh would be destroyed and the fishnet rendered substantially useless. As a matter of fact, it has been found that as little handling as is required between the formation of a fishnet and its packing and unpacking, will open up knots formed of strands of ordinary uncoated synthetic material, whereas, in actual fishing practice, the nets of the present invention remain firmly knotted and their mesh remains permanently set.

In addition to being formed into fishnets as originally manufactured, the strands of the present invention are also employed in the fishing industry for purposes of making repairs, in the event that breakages occur in the nets as initially produced.

While the invention has been described particularly in connection with the manufacture of fishnets, in which the strands forming the net are made from the coated cores, it is to be understood that, if desired, the fishnet might first be formed from strands of the core material and the strands of the net subsequently coated with the coating material, but before the net is stretched to tighten the knots.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

This application is a continuation-in-part of our application Serial No. 119,578, filed October 5, 1949, now abandoned.

We claim:

1. A fishnet consisting mainly of coated high-polymer synthetic resin strands knotted together at intervals to form the desired open mesh of the fishnet, each of the coated strands comprising a core of high-polymer synthetic resin stretched and set to render it substantially retraction-proof when the fishnet is wetted at ordinary temperatures of use, and a water-insoluble coating of synthetic resin tightly adhering to said core, which coating has greater compressibility than the material of said stretched and set core, the coating of one strand being forced into tight engagement with the similar coating of another strand at the knotted-together portions of the fishnet whereby the fishnet is rendered substantially immune to the opening-up of its said knotted-together portions under conditions of use.

2. A fishnet as defined in claim 1 in which the strand core has a minimum elongation of about 14% and a maximum elongation determined by the formula:

$$E_m = 20 + (D_t - 420) \times 0.002$$

in which $E_m$ is the maximum elongation of the strand and $D_t$ is the true denier of the strand.

3. A fishnet as defined in claim 2 in which the strand core is formed of a synthetic resin from the class consisting of linear polyamide resins, acrylic resins, polyester resins, vinyl resins and copolymers thereof, and the coating is formed from a synthetic resin from the class consisting of linear polyamide resins, acrylic resins, polyester resins, vinyl resins, polystyrene resins, coumarone resins, melamine-formaldehyde resins, furan resins and copolymers thereof.

4. A fishnet as defined in claim 2 in which the strand core is formed of a polyamide resin.

5. A fishnet as defined in claim 2 in which the strand core is formed of a resin resulting from the copolymerization of vinylidene chloride and acrylonitrile.

6. A fishnet as defined in claim 2 in which the strand core is formed of an ester-type resin.

7. A fishnet as defined in claim 2 in which the coating is formed of a polystyrene resin.

8. A fishnet consisting mainly of coated high-polymer synthetic resin strands knotted together at intervals to form the desired open mesh of the fishnet; each of the said coated strands comprising a multi-filament core of high-polymer synthetic resin stretched and set to render it substantially retraction-proof when the fishnet is wetted at ordinary temperatures of use, and a water-insoluble coating of synthetic resin adhering to and penetrated between the individual filaments of the said multi-filament core, which coating has greater compressibility than the material of said stretched and set core, the coating of one multi-filament strand being forced into tight engagement with the similar coating of another multi-filament strand at the knotted-together portions of the fishnet, whereby the fishnet is rendered substantially immune to the opening-up of its said knotted-together portions under conditions of use.

9. A fishnet as defined in claim 8 in which the strand core has a minimum elongation of about 14% and a maximum elongation determined by the formula:

$$E_m = 20 + (D_t - 420) \times 0.002$$

in which $E_m$ is the maximum elongation of the strand and $D_t$ is the true denier of the strand.

10. A fishnet as defined in claim 9 in which the strand core is formed of a synthetic resin from the class consisting of linear polyamide resins, acrylic resins, polyester resins, vinyl resins and copolymers thereof, and the coating is formed from a synthetic resin from the class consisting of linear polyamide resins, acrylic resins, polyester resins, vinyl resins, polystyrene resins, coumarone resins, melamine-formaldehyde resins, furan resins and copolymers thereof.

11. A coated, knot-retentive strand adapted for use in knotted fishnets comprising a core formed of a continuous-filament-forming synthetic resin which has been set and rendered substantially retraction-proof upon wetting at normal temperatures and a coating of a water-insoluble synthetic resinous material which is more compressible than the core, which has sufficiently high polarity to cause it to tightly adhere to and form a good bond with the core, which has a minimum elongation of about 14% and which has a maximum elongation determined by the formula:

$$E_m = 20 + (D_t - 420) \times 0.002$$

in which $E_m$ is the maximum elongation of the strand and $D_t$ is the true denier of the strand.

12. A coated strand as defined in claim 11 in which the strand core is a multi-filament one and the coating at least partially penetrates between the filaments.

13. A coated strand as defined in claim 11 in which the strand core is formed of a synthetic resin from the class consisting of linear polyamide resins, acrylic resins, polyester resins, vinyl resins and copolymers thereof, and the coating is formed from a synthetic resin from the class consisting of linear polyamide resins, acrylic resins, polyester resins, vinyl resins, polystyrene resins, coumarone resins, melamine-formaldehyde resins, furan resins and copolymers thereof.

14. A coated strand as defined in claim 11 in which the strand core is formed of a polyamide resin.

15. A coated strand as defined in claim 11 in which the strand core is formed of a resin resulting from the copolymerization of vinylidene chloride and acrylonitrile.

16. A coated strand as defined in claim 11 in which the strand core is formed of an ester-type resin.

17. A coated strand as defined in claim 12 in which the strand core is formed of a polyamide resin.

18. The method of producing coated, continuous-filamentary strands of synthetic resin suitable for use in fish nets which comprises applying to a core of synthetic resin a liquid coating composition containing an aqueous medium and a heat-settable synthetic resinous material having greater compressibility than the material of the core, which has sufficiently high polarity to cause it to tightly adhere to and form a good bond with said core and which is more compressible than said core, stretching the core with the liquid coating composition thereon to an extent not substantially less than 30% of the dry breaking strength of the core but less than the actual breaking strength of the coated core, and subjecting the core while so stretched and while coated with the aqueous liquid coating composition to heat above the boiling point of the aqueous medium but insufficient to bring about a softening of the core for a length of time sufficient to dry and set the coating and to set the core in its stretched condition and to thereby substantially suppress the plastic memory of the material of the core and to render the core substantially retraction-proof.

19. The method of producing coated strands as defined in claim 18 in which the core is a multi-filament one and the coating material penetrates between the filaments of the core.

20. The method of producing coated strands as defined in claim 19 in which the impregnation of the core takes place while it is under such relative tension as not to appreciably stretch the core.

21. The method of producing coated strands as defined in claim 18 in which the coating liquid is an emulsion of polystyrene.

22. The method of producing coated strands as defined in claim 18 in which the liquid coating composition contains a polyamide resin and ethyl alcohol.

23. The method of producing coated strands as defined in claim 18 in which the strand core is formed of a synthetic resin from the class consisting of linear polyamide resins, acrylic resins, polyester resins, vinyl resins and copolymers thereof, and the coating is formed from a synthetic resin from the class consisting of linear polyamide resins, acrylic resins, polyester resins, vinyl resins, polystyrene resins, coumarone resins, melamine-formaldehyde resins, furan resins and copolymers thereof.

24. The method of producing coated strands as defined in claim 18 in which the heating and stretching of the strand core is so correlated that the resultant strand has a minimum elongation of about 14% and a maximum elongation determined by the formula:

$$E_m = 20 + (D_t - 420) \times 0.002$$

in which $E_m$ is the maximum elongation of the strand and $D_t$ is the true denier of the strand.

25. The method of producing coated strands as defined in claim 24 in which the strand core is a multi-filament one and the coating material penetrates between the filaments of the core.

26. The method of producing coated strands as defined in claim 24 in which the strand core is formed of a synthetic resin from the class consisting of linear polyamide resins, acrylic resins, polyester resins, vinyl resins and copolymers thereof, and the coating is formed from a synthetic resin from the class consisting of linear polyamide resins, acrylic resins, polyester resins, vinyl resins, polystyrene resins, coumarone resins, melamine-formaldehyde resins, furan resins and copolymers thereof.

27. The method of producing coated strands as defined in claim 24 in which the strand core is formed of a polyamide resin.

28. The method of producing coated strands as defined in claim 24 in which the strand core is formed of an ester-type resin.

29. The method of producing coated strands as defined in claim 24 in which the strand core is formed of a resin resulting from the copolymerization of vinylidene chloride and acrylonitrile.

30. The method of producing coated strands as defined in claim 24 in which the coating liquid is an emulsion of polystyrene.

31. The method of producing coated strands as defined in claim 24 in which the liquid coating composition contains a polyamide resin and ethyl alcohol.

WALTER E. THOMPSON, Jr.
ROLLIN W. TAYLOR.

REFERENCES CITED

The following references are of record in the file of this patent:

UNITED STATES PATENTS

| Number | Name | Date |
|---|---|---|
| 2,220,958 | Jennings | Nov. 12, 1940 |
| 2,238,694 | Graves | Apr. 14, 1941 |
| 2,514,187 | Bosomworth | July 4, 1950 |
| 2,533,439 | Elder | Dec. 12, 1950 |
| 2,536,312 | Saether | Jan. 2, 1951 |
| 2,544,223 | Ellis | Mar. 6, 1951 |

FOREIGN PATENTS

| Number | Country | Date |
|---|---|---|
| 616,549 | Great Britain | Jan. 24, 1949 |